US012595769B2

(12) United States Patent
Wang et al.

(10) Patent No.: US 12,595,769 B2
(45) Date of Patent: Apr. 7, 2026

(54) VARIABLE VALVE ACTUATION CONTROLS FOR ENGINES

(71) Applicant: Cummins Inc., Indianapolis, IN (US)

(72) Inventors: Ke Wang, Wuhan (CN); Kai Zou, Wuhan (CN); Wei Huang, Columbus, IN (US); Timothy Shipp, Seymour, IN (US); Xing Yang, Wuhan (CN)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 18/438,824

(22) Filed: Feb. 12, 2024

(65) Prior Publication Data

US 2024/0183317 A1 Jun. 6, 2024

Related U.S. Application Data

(63) Continuation of application No. PCT/US2022/075055, filed on Aug. 17, 2022.

(Continued)

(51) Int. Cl.
*F02D 13/02* (2006.01)

(52) U.S. Cl.
CPC .... *F02D 13/0215* (2013.01); *F02D 2200/024* (2013.01); *F02D 2200/0414* (2013.01);

(Continued)

(58) Field of Classification Search
CPC ............. F02D 13/0207; F02D 13/0215; F02D 13/0269; F02D 2041/001; F02D 2200/024;

(Continued)

(56) References Cited

U.S. PATENT DOCUMENTS 5,038,737 A * 8/1991 Nishiyama ............ F02P 5/1455 123/406.42
6,508,241 B2 * 1/2003 Miller ................. F02D 41/1454 123/480

(Continued)

FOREIGN PATENT DOCUMENTS

DE 10201301496 3/2015
DE 102018127319 5/2019

(Continued)

OTHER PUBLICATIONS

International Search Report and Written Opinion, PCT Appln. No. PCTUS22075055, filed Aug. 17, 2022, mailed Dec. 2, 2022 12 pgs.

*Primary Examiner* — Carl C Staubach
(74) *Attorney, Agent, or Firm* — Taft, Stettinius & Hollister LLP

(57) ABSTRACT

A system includes an engine including a valvetrain comprising one or more intake valves and one or more exhaust valves, a variable valve actuation (VVA) system electronically controllable to vary operation of the valvetrain to selectably operate the engine in either a Miller cycle or a non-Miller cycle, and an electronic control system configured to control the VVA system to change operation of the engine from the Miller-cycle to the non-Miller cycle if an engine speed condition is satisfied, a peak cylinder pressure (PCP) condition is satisfied, at least one of an air-fuel ratio (AFR) condition and an oxygen-fuel-control (OFC) condition is satisfied, and a minimum off time condition for the VVA system is satisfied.

27 Claims, 6 Drawing Sheets

Related U.S. Application Data

(60) Provisional application No. 63/234,060, filed on Aug. 17, 2021.

(52) U.S. Cl.
CPC ................ *F02D 2200/0602* (2013.01); *F02D 2200/0614* (2013.01); *F02D 2200/0618* (2013.01); *F02D 2200/101* (2013.01)

(58) Field of Classification Search
CPC ..... F02D 2200/0406; F02D 2200/0414; F02D 2200/0602; F02D 2200/0614; F02D 2200/0618; F02D 2200/101; F02D 2250/38; F02D 35/024; F02D 35/027
See application file for complete search history.

(56) References Cited

U.S. PATENT DOCUMENTS

| | | | | |
|---|---|---|---|---|
| 6,782,737 | B2 | 8/2004 | Wright | |
| 6,837,199 | B2 | 1/2005 | Matsuura et al. | |
| 7,000,600 | B1 * | 2/2006 | Yamada | F02D 41/40 123/494 |
| 7,142,975 | B2 * | 11/2006 | Wang | G01M 15/08 701/114 |
| 7,347,171 | B2 | 3/2008 | Leman | |
| 9,163,559 | B2 | 10/2015 | Nicholson et al. | |
| 9,222,429 | B2 * | 12/2015 | Luft | F02D 19/0642 |
| 10,787,976 | B1 * | 9/2020 | Gehrke | G01M 15/08 |
| 2004/0267431 | A1 * | 12/2004 | Pierpont | F02D 13/0226 701/115 |
| 2005/0199216 | A1 * | 9/2005 | Matsumoto | F02M 26/49 73/114.76 |
| 2006/0283414 | A1 * | 12/2006 | Yasui | F02D 41/0002 123/90.27 |
| 2009/0018746 | A1 | 1/2009 | Miller et al. | |
| 2014/0032080 | A1 * | 1/2014 | Gehrke | F02D 41/402 123/41.31 |
| 2015/0142294 | A1 * | 5/2015 | Hagari | F02D 35/026 701/101 |
| 2015/0245095 | A1 * | 8/2015 | Gonzalez | G06F 11/3438 725/28 |
| 2017/0051686 | A1 * | 2/2017 | Shipp | F02D 41/1401 |
| 2019/0146727 | A1 | 5/2019 | Suzuki | |
| 2020/0072134 | A1 | 3/2020 | Hotta | |
| 2020/0072135 | A1 | 3/2020 | Hotta et al. | |

FOREIGN PATENT DOCUMENTS

| | | |
|---|---|---|
| EP | 2489861 | 4/2017 |
| WO | 2019146727 | 8/2019 |
| WO | 2020062745 | 4/2020 |

* cited by examiner

VARIABLE VALVE ACTUATION CONTROLS FOR ENGINES

CROSS REFERENCE

The present disclosure is a continuation of International Application No. PCT/US22/75055 filed Aug. 17, 2022 and claims the benefit of and priority to U.S. Application No. 63/234,060 filed Aug. 17, 2022 the disclosures of which are hereby incorporated by reference.

TECHNICAL FIELD

The present application relates generally to engine system controls and more particularly, but not exclusively to variable valve actuation controls for engines and related apparatuses, methods, systems, and techniques.

BACKGROUND

Engines may utilize different combustion cycles which are suited for different operational states. Variable valve actuation (VVA) systems may be utilized to control operation and vary combustion cycles of such engines. A number of proposals have been made for controlling such engines and systems. Existing approaches suffer from a number of disadvantages, shortcomings, and unmet needs including those respecting transient operation and emissions and estimation of engine operating parameters such as cylinder pressure which are difficult or inconvenient to measure or sense. There remains a significant need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

A number of embodiments relating to variable valve actuation controls for an engine are disclosed. One embodiment is a unique apparatus providing variable valve actuation controls for an engine. Another embodiment is a unique system providing variable valve actuation controls for an engine. A further embodiment is a unique method of controlling variable valve actuation of an engine. Further embodiments, forms, objects, features, advantages, aspects, and benefits shall become apparent from the following description and drawings.

DETAILED DESCRIPTION OF EXAMPLE EMBODIMENTS

Figure 1:
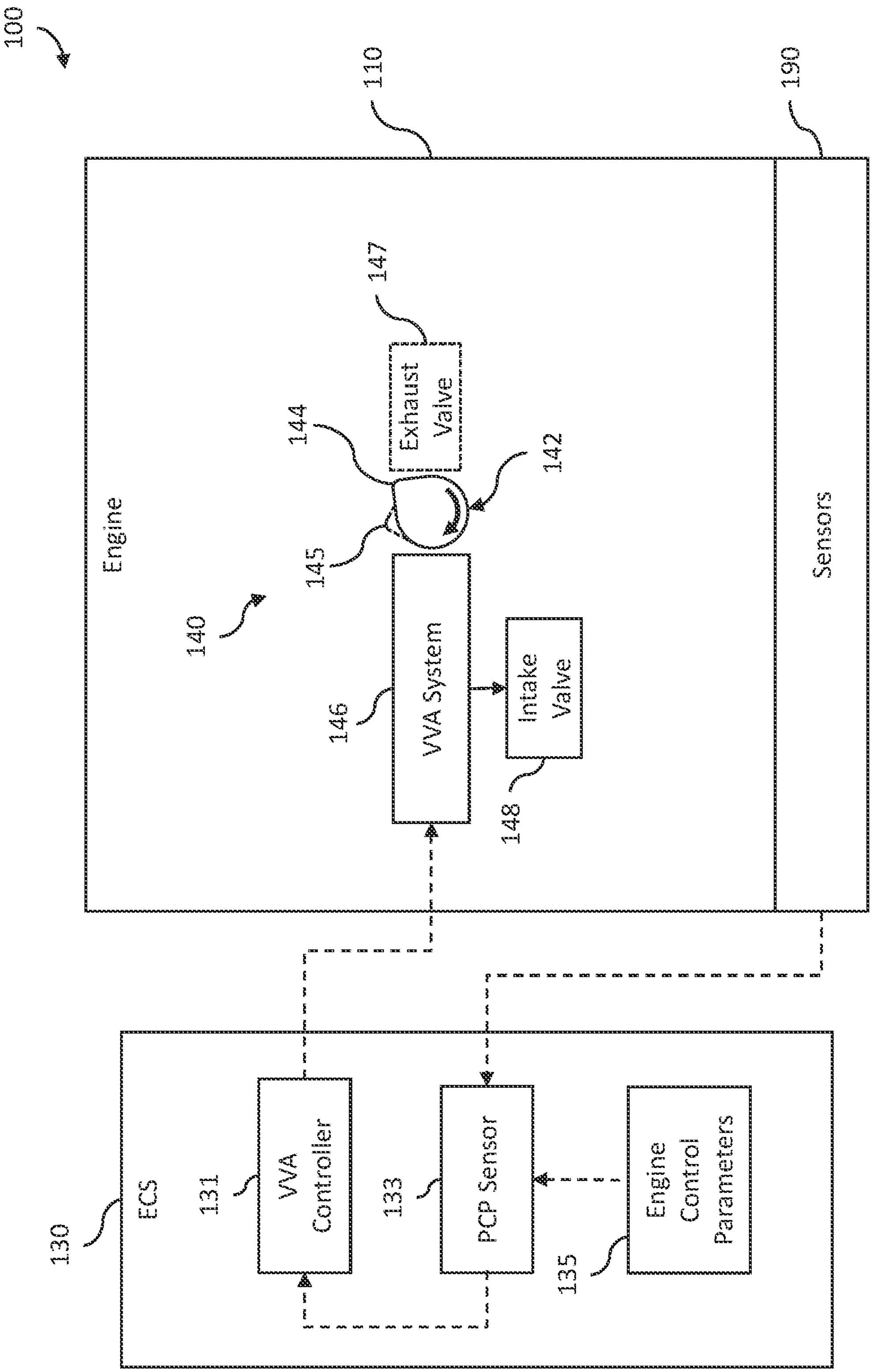
FIG. 1 is a schematic illustration of an example engine system.

With reference to FIG. 1, there is illustrated an example engine system 100 including an engine 110 operatively coupled with an electronic control system (ECS) 130. The engine 110 may be provided in a number of forms including, for example, a number of reciprocating piston-type engines such as diesel engines or other compression-ignition engines, natural gas, gasoline or other spark-ignition engines, dual-fuel engines, or other types of engines as will occur to one of skill in the art with the benefit of the present disclosure.

The engine 110 includes a valvetrain 140 which includes a camshaft 142 including an intake cam lobe 144 configured to actuate an intake valve 148, and an exhaust cam lobe 145 configured to actuate an exhaust valve 147. A variable valve actuation (VVA) system 146 is configured to vary the effect of the intake cam lobe 144 on actuation of the intake valve 148. The intake valve 146 and the exhaust valve 147 are respectively configured to regulate the intake to and exhaust from an engine cylinder (not depicted) during operation of the engine 110. The valvetrain 140 may include additional intake cam lobes, intake valves, exhaust cam lobes, and exhaust valves which may be associated with additional cylinders of the engine. The valvetrain 140 may include multiple intake valves and/or multiple exhaust valves for each cylinder. Thus, while a single intake cam lobe 144, intake valve 148, exhaust cam lobe 145, and exhaust valve 147 are illustrated in FIG. 1, typical multi-cylinder embodiments of the engine 110 and the valvetrain 140 shall be understood to include a plurality of intake cam lobes, intake valves, exhaust cam lobes, and exhaust valves associated with respective cylinders.

The VVA system 146 includes one or more actuators that vary the effect of intake cam lobe 144 on the intake valve 148 to thereby vary the lift profile of the intake valve 148. Such actuators may be hydraulic actuators or electromagnetic actuators, which may be configured and operable vary the effective distance between a cam lobe and a valve, or decouple or modify lift of a valve from that which would otherwise be realized by a given cam profile, such as by holding a valve open after the end of a cam dwell. Accordingly, a VVA system 146 may be provided in a number of forms including these and other types of actuators as will occur to one of skill in the art with the benefit and insight of the present disclosure.

Figure 4:
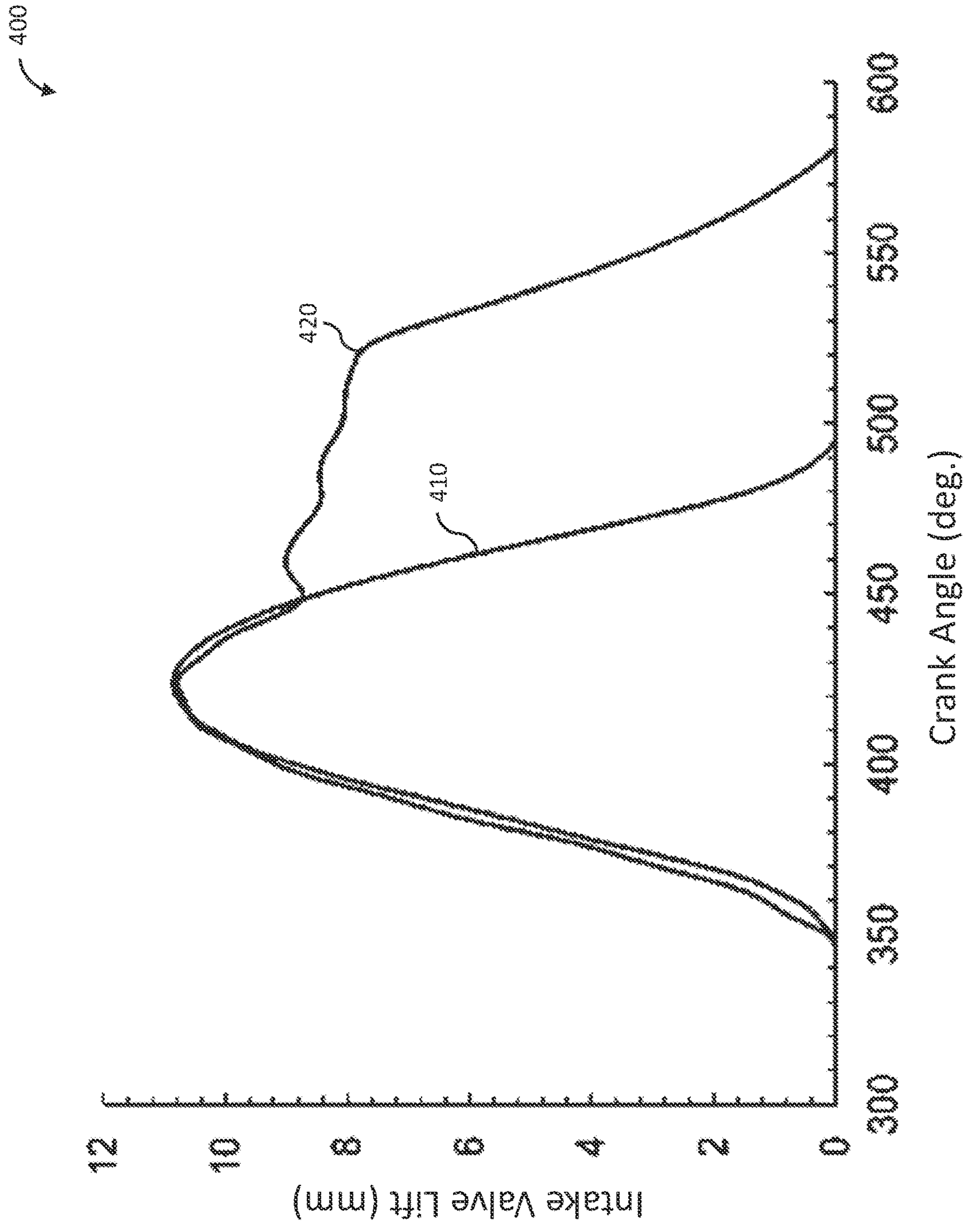
FIG. 4 is a graph depicting example intake valve lift profiles.

In the example embodiment of FIGS. 1, the intake cam lobe 144 is configured to perform early intake valve closing (EIVC) of the intake valve 148 when the VVA system 146 is off or deactivated. As illustrated in FIG. 4, EIVC operation of the intake valve 148 may have a valve lift profile according to curve 410 of graph 400 which illustrates intake valve lift in units of millimeters (mm) as a function of crank angle in units of degrees (deg.). The EIVC operation of the intake valve 148 provides Miller cycle operation of the engine system 100.

When the VVA system 146 is on or activated, the lift profile of the intake valve 148 is modified such that the intake cam lobe 144 in combination with the VVA system 146 provides non-EIVC operation of the intake valve 148 which may have a lift profile according to curve 420 of graph 400. The non-EIVC operation of the intake valve 148 provides non-Miller-cycle operation of the engine system 100. Thus activation and deactivation of the VVA system 146 may be performed to vary operation of the engine between Miller-cycle operation (when the VVA system 146 is off or deactivated) and non-Miller-cycle operation (when the VVA system 146 is on or activated).

It shall be appreciated that the valvetrain 140 may be implemented in a number of other forms including a number of additional components such as rockers, lash adjusters, bearing surfaces, gears, separate camshafts for intake cam lobes and exhaust cam lobes, and other components as will occur to one of skill in the art with the benefit and insight of the present disclosure. It shall be further appreciated that other embodiment may include and utilize other valvetrain configurations and forms in which activation and deactivation of a VVA system may vary operation of the engine between Miller-cycle operation and non-Miller-cycle operation.

ECS 130 preferably includes one or more programmable microprocessors or microcontrollers of a solid-state, integrated circuit type, and one or more non-transitory memory media configured to store instructions executable by the one or more microprocessors or microcontrollers. ECS 130 is configured to implement a VVA controller 131 which is configured to provide and output control commands to control operation of the VVA system 146 and a PCP sensor 133 which is configured to perform peak cylinder pressure estimations which are output to and utilized by the VVA controller 131 in controlling operation of the VVA system. The PCP sensor 133 may receive information from a plurality of sensors 190 associated with the engine system 100 as well as information of one or more engine control parameters 135. It shall be appreciated that FIG. 1 depicts control relationships between the foregoing components conceptually using dashed arrows and that various communications hardware and protocols may be utilized to implement, such as one or more controller area networks (CAN) or other communications components.

Sensors 190 main include one or more instances of the following sensors and associated input parameters. An engine speed sensor may be configured to provide an input parameter indicative of an engine speed. An Oxygen or lambda sensor may be configured to provide an input parameter indicative of an amount of concentration of oxygen of an intake charge and/or an air-fuel ratio of the intake charge. An injector rail pressure sensor may be configured to provide an input parameter indicative of a fuel pressure of a fuel injector rail. An intake charge pressure sensor may be configured to provide an input parameter indicative of the pressure of the intake charge. An intake charge temperature sensor may be configured to provide an input parameter indicative of the temperature of the intake charge. A number of additional and/or alternative sensors and associated input parameters may be provided in the sensors 190 as will occur to one of skill in the art with the benefit and insight of the present disclosure.

Engine control parameters 135 may include one or more instances of a number of engine control parameters indicative of a start of injection timing, a total amount of fuel in all injections, an amount of fuel in a first pilot injection, a timing of the first pilot injection, an amount of fuel in a second pilot injection, a timing of the second pilot injection, a timing of a main injection, an amount of fuel in a first post injection, a timing of the first post injection, an amount of fuel in a second post injection, a timing of the first post injection, and an amount of fuel in the main injection event. Such engine control parameters may be determined and provided by other controllers and control components of ECS 130.

The ECS 130 can be implemented in any of a number of ways that combine or distribute the control function across one or more control units in various manners. The ECS 130 may execute operating logic that defines various control, management, and/or regulation functions. This operating logic may be in the form of dedicated hardware, such as a hardwired state machine, analog calculating machine, programming instructions, and/or a different form as would occur to those skilled in the art. The ECS 130 may be provided as a single component or a collection of operatively coupled components; and may be comprised of digital circuitry, analog circuitry, or a hybrid combination of both of these types. When of a multi-component form, the ECS 130 may have one or more components remotely located relative to the others in a distributed arrangement. The ECS 130 can include multiple processing units arranged to operate independently, in a pipeline processing arrangement, in a parallel processing arrangement, or the like. It shall be further appreciated that the ECS 130 and/or any of its constituent components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or components as would occur to those skilled in the art to perform the desired communications.

Figure 2A:
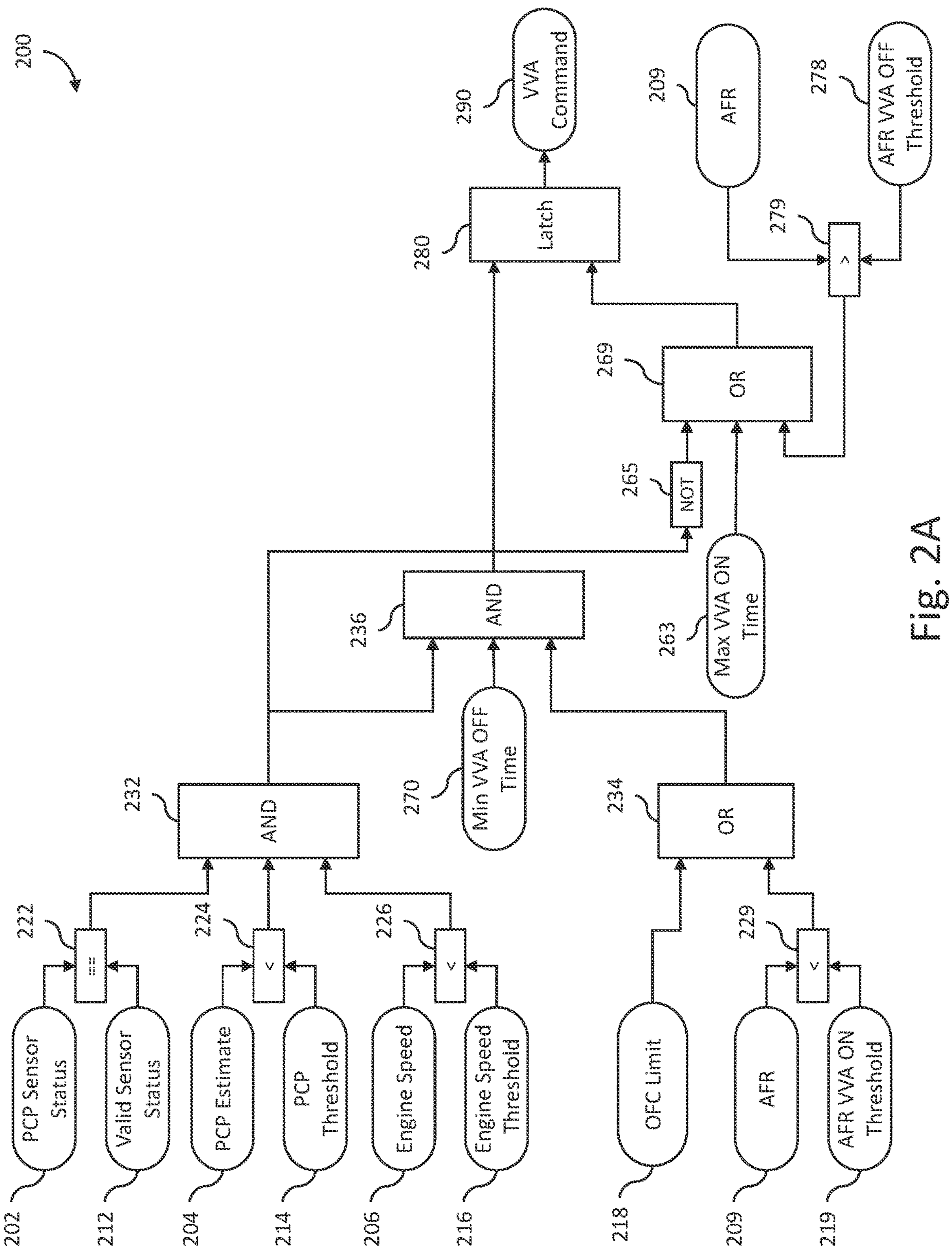
FIGS. 2A and 2B are logic diagrams illustrating example variable valve actuation (VVA) control logic.
Figure 2B:
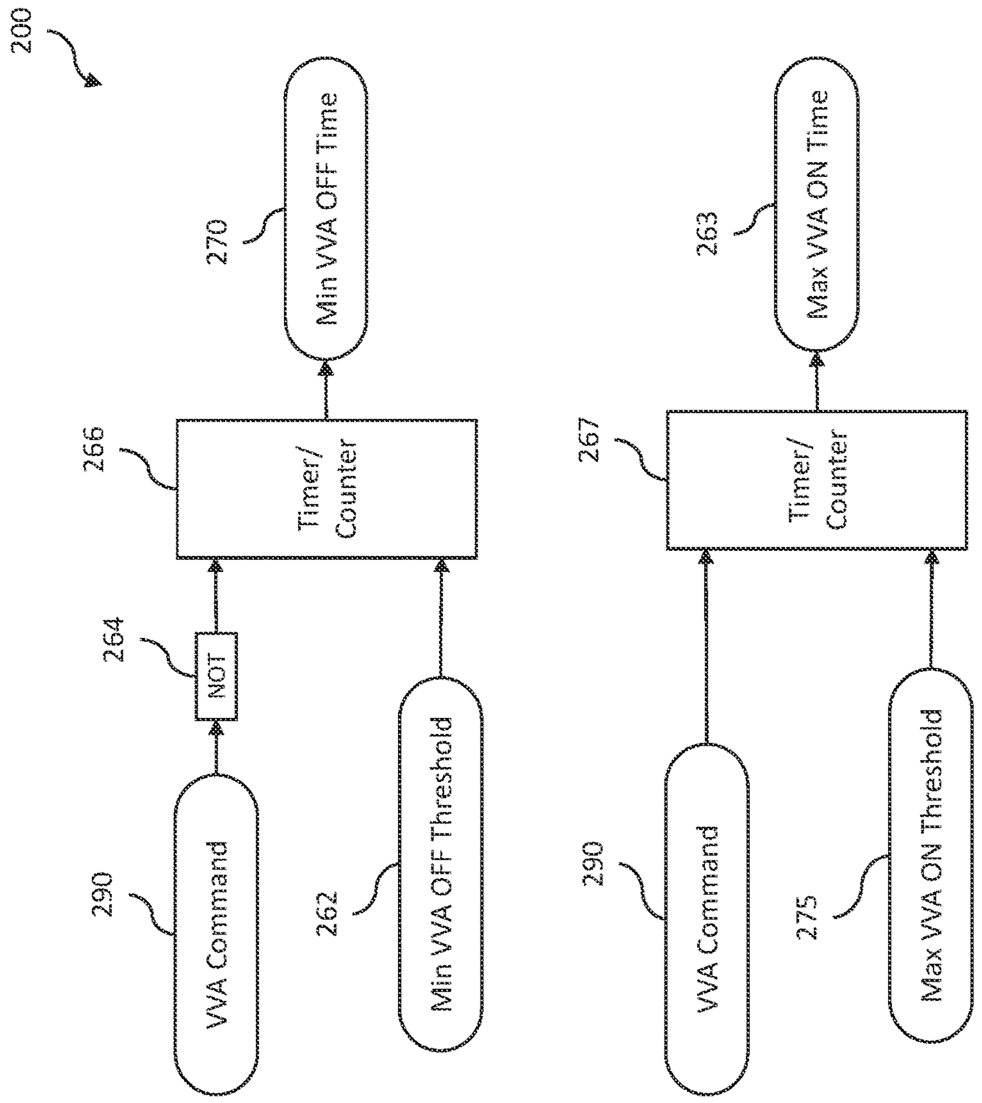

With reference to FIGS. 2A and 2B, there are illustrated example VVA controls 200 (also referred to herein as controls 200) which may be implemented in and executed by ECS 130 or another electronic control system. For example, controls 200 may be implemented and executed in whole or in part by VVA controller 146 alone or in combination with other electronic control system components. Controls 200 are configured to determine and provide a VVA command 290 which is configured and effective to control operation of a VVA system such as VVA system 146 to selectably provide Miller cycle operation and non-Miller cycle operation of an engine system such as engine system 100. When applied to engine system 100 and ECS 130, controls 200 may selectably provide Miller cycle operation of engine system 100 by r deactivating the VVA system 146 so that intake cam lobe 144 provides EIVC operation of the intake valve 148, and selectably provide non-Miller cycle operation of engine system 100 by activating the VVA system 146 so that intake cam lobe 144 provides non-EIVC operation of the intake valve 148.

PCP sensor status 202 and valid sensor status 212 are provided as inputs to operator 222 which evaluates whether the PCP sensor status 202 is equal to the valid sensor status 212 and provides the result of this evaluation to operator 232. PCP sensor status 202 provides an indication of the operational state of a peak cylinder pressure sensor such as PCP sensor 133. Valid sensor status 212 provides an indication of a valid operational state of the peak cylinder pressure sensor. Thus, the evaluation performed by operator 222 provides an indication of whether the peak cylinder pressure sensor is operating correctly based on one or more criteria such as an on flag, diagnostic, rationality evaluation, output range evaluation or other evaluations, diagnostics, and flags as will occur to one of skill in the art with the benefit and insight of the present disclosure.

PCP estimate 204 and PCP threshold 214 are provided as inputs to operator 224 which evaluates whether the PCP estimate 204 is less than the PCP threshold 214 and provides the result of this evaluation to operator 232. PCP estimate 204 indicates a peak cylinder pressure value provided by a peak cylinder pressure sensor. PCP threshold 214 indicates a maximum threshold or limit on peak cylinder pressure above which non-Miller cycle operation of an engine system is not permitted. PCP threshold 214 may be configured based on a reliability or safety requirement of a given engine design. In some forms PCP threshold 214 may be calibratible based on requirements of a selected engine design or requirements of a selected engine mission. PCP threshold 214 may further be configured to account for an increase in peak cylinder pressure that may result from a transition from Miller cycle operation to non-Miller cycle operation. For example, a transition from EIVC operation to non-EIVC operation may result in an increase in peak cylinder pressure due to an increase in volume of the intake charge. Thus, the evaluation performed by operator 224 provides an indication of whether the peak cylinder pressure of an engine system is of a magnitude permitting a transition to non-Miller cycle operation of an engine system.

Engine speed 206 and engine speed threshold 216 are provided as inputs to operator 226 which evaluates whether the engine speed 206 is less than the engine speed threshold 216 and provides the result of this evaluation to operator 232. Engine speed 206 indicates an engine speed value provided by an engine speed sensor. Engine speed threshold 216 indicates a maximum threshold or limit on engine speed above which non-Miller cycle operation of an engine system is not permitted. Engine speed threshold 216 may be configured based on a reliability or safety requirement of a given engine design. In some forms, Engine speed threshold 216 may be calibratible based on requirements of a selected engine design or requirements of a selected engine mission. Engine speed threshold 216 may further be configured to account for an increase in engine speed that may result from a transition from Miller cycle operation to non-Miller cycle operation. For example, a transition from EIVC operation to non-EIVC operation may result in an increase in engine speed due to an increase in volume of the intake charge. Thus, the evaluation performed by operator 226 provides an indication of whether an engine speed is of a magnitude permitting non-Miller cycle operation of the engine system.

Operator 232 performs a logical AND operation on the inputs that it receives from operator 222, operator 224, and operator 226 and provides the result of the logical AND operation to operator 236 and to logical NOT operator 265. Thus, when the outputs of operator 222, operator 224, and operator 226 are all true, the output of operator 232 is also true, and when any of the outputs of operator 222, operator 224, and operator 226 is false, the output of operator 232 is also false. It shall be appreciated that reference herein to logic states or values as “true” is synonymous with and includes affirmative, enabled, or high logic states or values, among other logic terms as will occur to one of skill in the art with the benefit of the present disclosure. Likewise, it shall be appreciated that reference herein to logic states or values as “false” is synonymous with and includes negative, disabled, or low logic states or values, among other logic terms as will occur to one of skill in the art with the benefit of the present disclosure.

AFR 209 and AFR VVA ON threshold 219 are provided as inputs to operator 229 which evaluates whether the AFR 209 is less than the AFR VVA ON threshold 219 and provides the result of this evaluation to operator 234. AFR 209 indicates an air-fuel ratio of the charge combusted by the engine system provided by a sensor such as an oxygen or lambda sensor. AFR VVA ON threshold 219 indicates a maximum threshold or limit on the air-fuel ratio of the charge combusted by the engine system above which non-Miller cycle operation of an engine system is not permitted. AFR VVA ON threshold 219 may be configured and selected based on an emissions limit established relative to a given engine design or relative to an individual engine. For example, AFR VVA ON threshold 219 may be configured and selected based on smoke or particulate emissions during engine transients of an engine operating in a Miller cycle such as an EIVC Miller cycle. Thus, the evaluation performed by operator 229 provides an indication of whether the air-fuel ratio of the charge combusted by the engine system is of a magnitude such that non-Miller cycle operation of the engine system is desired to achieve desired emissions performance.

OFC limit 218 is provided as an input to operator 234. Operator 234 performs a logical OR operation on the inputs received from operator 229 and OFC limit 218 and provides the result of this operation to operator 236. OFC limit 218 provides an indication that the engine system is operating an oxygen-fuel control (OFC) mode. The OFC mode is determined based upon an evaluation that a ratio of oxygen to fuel in the charge combusted by the engine system has exceeded a minimum threshold or limit. The ratio of oxygen to fuel in the charge combusted by the engine is related to but may vary from the air-fuel ratio due to effects of EGR fraction, residual gases, and charge flow. One non-limiting example of an OFC limit determination is found in U.S. Pat. No. 6,508,241 issued Jan. 21, 2003, the disclosure of which is incorporated by reference. OFC limit 218 may correspond to engine operating conditions in which a transition to non-Miller cycle operation is desired to mitigate smoke or particulate emissions that may arise during engine transients of an engine operating in a Miller cycle such as an EIVC Miller cycle. Thus, OFC limit 218 provides an indication of whether the oxygen-fuel ratio of the charge combusted by the engine system is of a magnitude such that non-Miller cycle operation of the engine system is desired to achieve desired emissions performance.

As illustrated in FIG. 2B, VVA command 290 is provided as input to logical NOT operator which provides the logical inverse of the VVA command as output to timer/counter 266. Timer/counter 266 may be configured and provided as a timer, a counter, a universal timer counter, or in other forms as will occur to one of skill in the art. Timer/counter 266 also receives minimum VVA OFF threshold 262 as an input and compares the time or count number for which the value received from logical NOT operator 264 has been true against the minimum VVA OFF threshold 262. When the minimum VVA OFF threshold 262 has been met or exceeded, timer/counter 266 sets the value of minimum VVA off time 270 to true and provides the same as input to operator 236. A true value of minimum VVA off time 270 indicates that VVA has been off or inactive for a minimum time or count required to allow activation of a VVA system to provide non-Miller cycle operation and a false value indicates the contrary.

Operator 236 performs a logical AND operation on the inputs it receives from operator 232, operator 234, and minimum VVA off time 270 and provides the result of this operation to latch 280 which, in turn, sets the value of VVA command 290. Thus, when the inputs received from operator 232, operator 234, and minimum VVA off time 270 are all true, the value of VVA command 290 is set to true.

AFR 209 and AFR VVA OFF threshold 278 are provided as inputs to operator 279 which evaluates whether the AFR 209 is greater than the AFR VVA OFF threshold 278 and provides the result of this evaluation to operator logical OR operator 269. AFR 209 indicates an air-fuel ratio of the charge combusted by the engine system provided by a sensor such as an oxygen or lambda sensor. AFR VVA OFF threshold 278 indicates a threshold or limit on the air-fuel ratio of the charge combusted by the engine system above which non-Miller cycle operation of an engine system is not permitted. AFR VVA OFF threshold 278 may be configured and selected to avoid excessive charge flow which worsen fuel economy and reduce or limit the VVA on time to enhance reliability. Thus, the evaluation performed by operator 279 provides an indication of whether the air-fuel ratio of the charge combusted by the engine system is of a magnitude such that Miller cycle operation of the engine system is desired to achieve desired fuel economy and to reduce or limit VVA on time to enhance reliability.

As illustrated in FIG. 2B, VVA command 290 is provided as input to timer/counter 267. Timer/counter 267 may be configured and provided as a timer, a counter, a universal timer counter, or in other forms as will occur to one of skill in the art. Timer/counter 267 also receives maximum VVA ON threshold 275 as an input and compares the time or count number for which the value of the input received from VVA command 290 has been true against the maximum VVA ON threshold 275. When the maximum VVA ON threshold 275 has been met or exceeded, timer/counter 267 sets the value of maximum VVA on time 263 to true and provides the same as input to logical OR operator 269. A true value of maximum VVA on time 263 indicates that VVA has been on or activated for a maximum permitted time or count beyond which activation of a VVA system to provide non-Miller cycle operation is not permitted and a false value indicates the contrary.

As indicated above, the output of logical NOT operator 265, the output of operator 229, and the maximum VVA ON time 263 are provided as inputs to logical OR operator 269. Logical OR operator 269 performs a logical OR operation on the inputs received from logical NOT operator 265, operator 229, and the maximum VVA ON time 263 and provides the result of this operation to latch 280 which, in turn, sets the value of VVA command 290. Thus, when a value of any of the inputs received from logical NOT operator 265, operator 229, and the maximum VVA ON time 263 is true, the value of VVA command 290 is set to false.

Figure 3A:
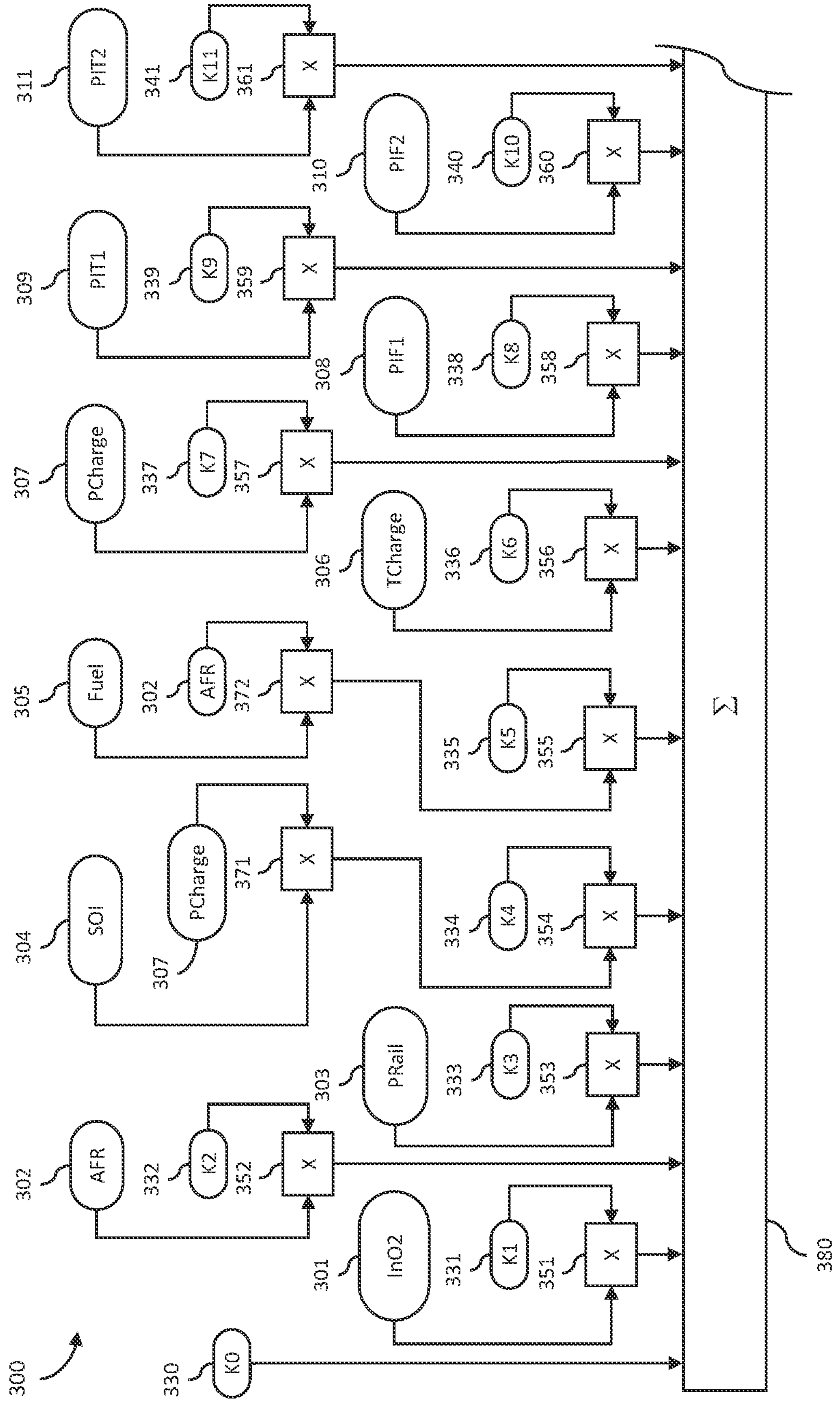
FIGS. 3A and 3B are logic diagrams illustrating example peak cylinder pressure (PCP) sensor logic.
Figure 3B:
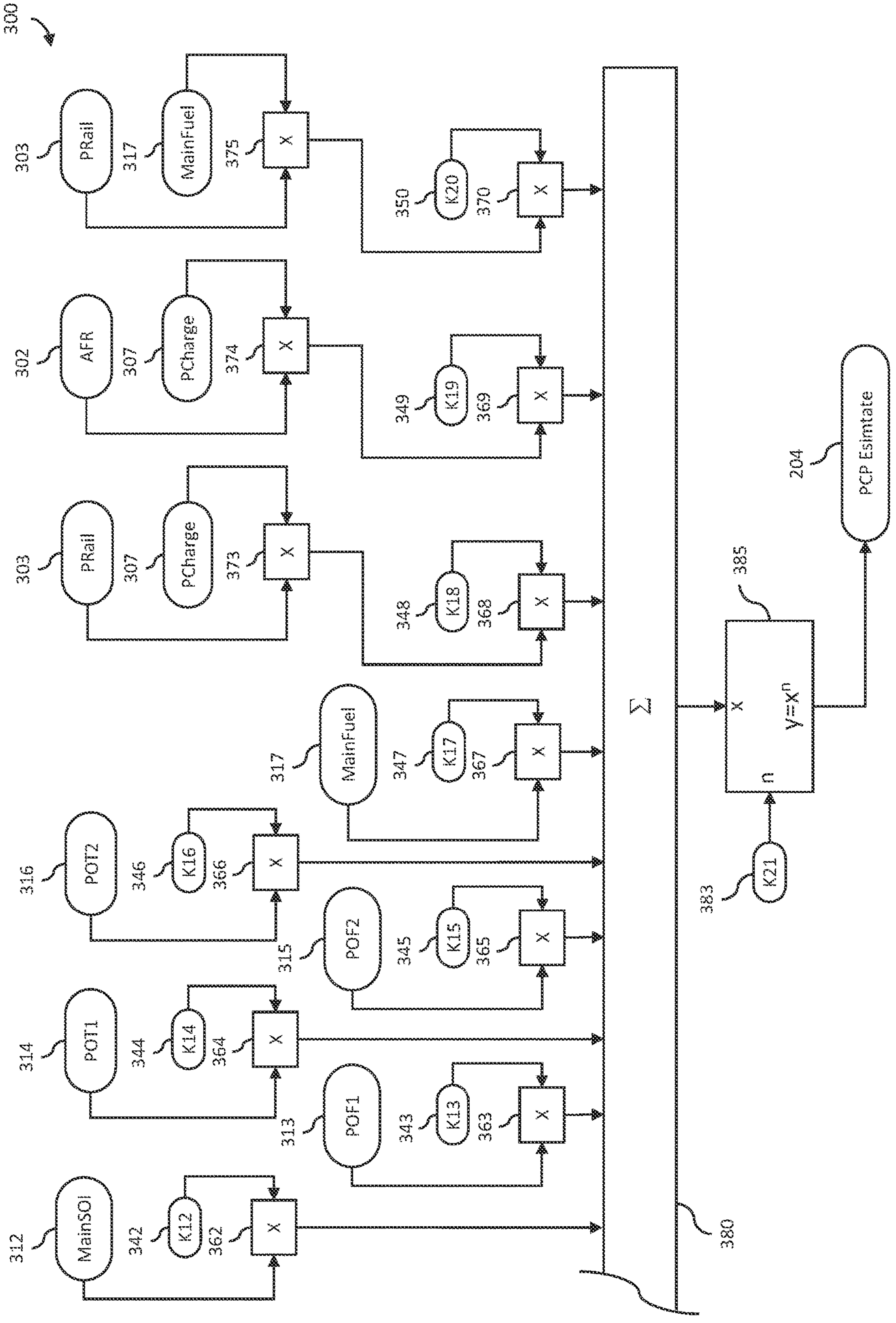

With reference to FIGS. 3A and 3B, there are illustrated example PCP sensor controls 300 (also referred to herein as controls 300) which may be implemented in and executed by ECS 130 or another electronic control system. Controls 300 may, for example, be implemented and executed in whole or in part by PCP sensor 133 alone or in combination with other electronic control system components. Controls 300 are configured to determine and provide estimates of peak cylinder pressure (PCP) which may, in turn, be utilized in controlling a VVA system such as VVA system 146 to selectably provide Miller cycle operation and non-Miller cycle operation of an engine system such as engine system 100.

Controls 300 are configured and operable to perform a calculation according to equation (1):

$$\text{PCP}=(K0+(K1\times\text{InO2})+(K2\times\text{AFR})+(K3\times\text{PRail})+(K4\times\text{SOI}\times\text{PCharge})+(K5\times\text{AFR}\times\text{Fuel})+(K6\times\text{TCharge})+(K7\times\text{PCharge})+(K8\times\text{PIF1})+(K9\times\text{PIT1})+(K10\times\text{PIF2})+(K11\times\text{PIT2})+(K12\times\text{MainSOI})+(K13\times\text{POF1})+(K14\times\text{POT1})+(K15\times\text{POF2})+(K16\times\text{POT2})+(K17\times\text{MainFuel})+(K18\times\text{PRail}\times\text{PCharge})+(K19\times\text{AFR}\times\text{PCharge})+(K20\times\text{PRail}\times\text{MainFuel}))\hat{}K21$$

In equation (1), K0 through K21 are coefficients which may be statistically determined from a dataset of empirical values using multi-parameter coefficient techniques such as multiple linear regression models or other parameter coefficient determination techniques. The terms of equation (1) are further described in Table 1 below along with the reference numerals utilized to designate the corresponding input parameters of FIGS. 3A and 3B.

TABLE 1

| Equation (1) Term | Description | Reference Numeral |
|---|---|---|
| PCP | peak cylinder pressure | 204 |
| InO2 | amount of Oxygen ($O_2$) in the intake charge | 301 |
| AFR | air-fuel ratio of the intake charge | 302 |
| PRail | injector rail pressure | 303 |
| SOI | start of injection timing | 305 |
| PCharge | intake charge pressure | 307 |
| Fuel | total amount of fuel in all injections | 305 |
| TCharge | intake charge temperature | 306 |
| PIF1 | amount of fuel in a first pilot injection | 308 |
| PIT1 | timing of the first pilot injection | 309 |
| PIF2 | amount of fuel in a second pilot injection | 310 |
| PIT2 | timing of the second pilot injection | 311 |
| MainSOI | timing of a main injection | 312 |
| POF1 | amount of fuel in a first post injection | 313 |
| POT1 | timing of the first post injection | 314 |
| POF1 | amount of fuel in a second post injection | 314 |
| POT1 | timing of the first post injection | 316 |
| MainFuel | amount of fuel in the main injection event | 317 |

As illustrated in FIGS. 3A and 3B, values according to the coefficients K0 through K20 and terms of Equation (1) described in Table 1 above are provided as input parameters to respective multiplication operators 351 through 375 which multiply their respective inputs and output the resulting product either to summation operator 380 (in the case of multiplication operators 351 through 370) or to other intermediate multiplication operators (in the case of multiplication operators 371 through 375). Summation operator 380 adds the inputs which it receives and outputs the resulting sum to exponential operator 385. Coefficient K21 is also provided to exponential operator 385 which then calculates and outputs a peak cylinder pressure value PCP 204 as an exponential function of the sum received from summation operator 380 raised to an exponent defined by coefficient K21.

As illustrated by this detailed description, the present disclosure contemplates and includes a plurality of embodiments including the following examples. A first example embodiment is a system comprising: an engine including a valvetrain comprising one or more intake valves and one or more exhaust valves; a variable valve actuation (VVA) system electronically controllable to vary operation of the valvetrain to selectably operate the engine in either a Miller cycle or a non-Miller cycle; and an electronic control system configured to control the VVA system to change operation of the engine from the Miller-cycle to the non-Miller cycle if: an engine speed condition is satisfied, a peak cylinder pressure (PCP) condition is satisfied, at least one of an air-fuel ratio (AFR) condition and an oxygen-fuel-control (OFC) condition is satisfied, and a minimum off time condition for the VVA system is satisfied.

A second example embodiment includes the features of the first example embodiment, wherein the engine speed condition is satisfied if an engine speed does not exceed an engine speed threshold.

A third example embodiment includes the features of the first example embodiment, wherein the PCP condition is satisfied if an estimated peak cylinder pressure of the engine does not exceed a PCP threshold.

A fourth example embodiment includes the features of the first example embodiment, wherein one of the AFR condition is satisfied if an air-fuel-ratio of the engine does not exceed an AFR threshold, and the OFC condition is satisfied if the engine is operating in an oxygen fuel control mode.

A fifth example embodiment includes the features of the first example embodiment, wherein the minimum off time condition for the VVA system is satisfied if the VVA system has been off or deactivated for at least a predetermined time.

A sixth example embodiment includes the features of the first example embodiment, wherein the electronic control system is configured to control the VVA system to change operation of the engine from the non-Miller cycle to the Miller-cycle if any of: the engine speed condition is not satisfied, the PCP condition is not satisfied, the AFR condition is not satisfied, and a maximum on time condition for the VVA system is satisfied.

A seventh example embodiment includes the features of the sixth example embodiment, wherein the maximum on time condition for the VVA system is satisfied if the VVA system has been on or activated for at least a predetermined time.

An eighth example embodiment includes the features of the first example embodiment, wherein the PCP condition compares a peak cylinder pressure value provided by a virtual sensor to a PCP threshold.

A ninth example embodiment includes the features of the eighth example embodiment, wherein the virtual sensor is configured to determine the peak cylinder pressure value in response to a combination of input parameters comprising one or more of: an intake charge amount of Oxygen, an intake charge air-fuel ratio, an injector rail pressure, a start of injection timing, an intake charge pressure, a total amount of fuel in all injections, an intake charge temperature, an amount of fuel in a first pilot injection, a timing of the first pilot injection, an amount of fuel in a second pilot injection, a timing of the second pilot injection, a timing of a main injection, an amount of fuel in a first post injection, a timing of the first post injection, an amount of fuel in a second post injection, a timing of the first post injection, and an amount of fuel in a main injection event.

A tenth example embodiment includes the features of the ninth example embodiment, wherein the virtual sensor is configured to determine the peak cylinder pressure value in accordance with the equation: PCP=(K0+(K1×InO2)+(K2×AFR)+(K3×PRail)+(K4×SOI×PCharge)+(K5×AFR×Fuel)+(K6×TCharge)+(K7×PCharge)+(K8×PIF1)+(K9×PIT1)+(K10×PIF2)+(K11×PIT2)+(K12×MainSOI)+(K13×POF1)+(K14×POT1)+(K15×POF2)+(K17×MainFuel) (K16×POT2)++(K18×PRail×PCharge)+(K19×AFR×PCharge)+(K20×PRail×MainFuel))^K21; wherein, K0, K1, K2, K3, K4, K5, K6, K7, K8, K9, K10, K11, K12, K13, K14, K15, K16, K17, K18, K19, K20, and K21 are coefficients which are statistically determined from a dataset of empirical values, PCP is a peak cylinder pressure, InO2 is an amount of Oxygen (O2) in an intake charge, AFR is the intake charge air-fuel ratio, PRail is a injector rail pressure, SOI is a start of injection timing, PCharge is an intake charge pressure, Fuel is a total amount of fuel in all injections, TCharge is an intake charge temperature, PIF1 is an amount of fuel in a first pilot injection, PIT1 is a timing of the first pilot injection, PIF2 is an amount of fuel in a second pilot injection, PIT2 is an timing of the second pilot injection, MainSOI is a timing of a main injection, POF1 is an amount of fuel in a first post injection, POT1 is a timing of the first post injection, POF1 is an amount of fuel in a second post injection, POT1 is a timing of the first post injection, and MainFuel is an amount of fuel in the main injection event.

An eleventh example embodiment is a method of operating an engine system including a valvetrain comprising one or more intake valves and one or more exhaust valves, a variable valve actuation (VVA) system electronically controllable to vary operation of the valvetrain to selectably operate the engine in either a Miller cycle or a non-Miller cycle, and an electronic control system configured to control the VVA system, the method comprising: evaluating using the electronic control system whether an engine speed condition is satisfied, a peak cylinder pressure (PCP) condition is satisfied, at least one of an air-fuel ratio (AFR) condition and an oxygen-fuel-control (OFC) condition is satisfied, and a minimum off time condition for the VVA system is satisfied; and operating the electronic control system to change operation of the engine from the Miller-cycle to the non-Miller cycle in response to the evaluating indicating that the engine speed condition is satisfied, the peak cylinder pressure (PCP) condition is satisfied, at least one of the air-fuel ratio (AFR) condition and the oxygen-fuel-control (OFC) condition is satisfied, and the minimum off time condition for the VVA system is satisfied.

A twelfth example embodiment includes the features of the eleventh example embodiment, wherein the evaluating indicates that the engine speed condition is satisfied if an engine speed does not exceed an engine speed threshold.

A thirteenth example embodiment includes the features of the eleventh example embodiment, wherein the evaluating indicates that the PCP condition is satisfied if an estimated peak cylinder pressure of the engine does not exceed a PCP threshold.

A fourteenth example embodiment includes the features of the eleventh example embodiment, wherein the evaluating indicates that one of the AFR condition is satisfied if an air-fuel-ratio of the engine does not exceed an AFR threshold, and the evaluating indicates that the OFC condition is satisfied if the engine is operating in an oxygen fuel control mode.

A fifteenth example embodiment includes the features of the eleventh example embodiment, wherein the evaluating indicates that the minimum off time condition for the VVA system is satisfied if the VVA system has been off or deactivated for at least a predetermined time.

A sixteenth example embodiment includes the features of the eleventh example embodiment and comprises: additionally evaluating whether the engine speed condition is not satisfied, the PCP condition is not satisfied, the AFR condition is not satisfied, and a maximum on time condition for the VVA system is satisfied; and additionally operating the electronic control system to change operation of the engine from the non-Miller cycle to the Miller-cycle in response to the additionally evaluating indicating that any of: the engine speed condition is not satisfied, the PCP condition is not satisfied, the AFR condition is not satisfied, and a maximum on time condition for the VVA system is satisfied.

A seventeenth example embodiment includes the features of the sixteenth example embodiment, wherein the additionally evaluating indicates that the maximum on time condition for the VVA system is satisfied if the VVA system has been on or activated for at least a predetermined time.

An eighteenth example embodiment includes the features of the eleventh example embodiment, and comprises: determining the PCP condition by comparing a peak cylinder pressure value provided by a virtual sensor to a PCP threshold.

A nineteenth example embodiment includes the features of the eighteenth example embodiment, and comprises operating the virtual sensor to determine the peak cylinder pressure value in response to a combination of input parameters comprising one or more of: an intake charge amount of Oxygen, an intake charge air-fuel ratio, an injector rail pressure, a start of injection timing, an intake charge pressure, a total amount of fuel in all injections, an intake charge temperature, an amount of fuel in a first pilot injection, a timing of the first pilot injection, an amount of fuel in a second pilot injection, a timing of the second pilot injection, a timing of a main injection, an amount of fuel in a first post injection, a timing of the first post injection, an amount of fuel in a second post injection, a timing of the first post injection, and an amount of fuel in a main injection event.

A twentieth example embodiment includes the features of the nineteenth example embodiment, and comprises: operating the virtual sensor to determine the peak cylinder pressure value in accordance with the equation: $PCP=(K0+(K1\times InO2)+(K2\times AFR)+(K3\times PRail)+(K4\times SOI\times PCharge)+(K5\times AFR\times Fuel)+(K6\times TCharge)+(K7\times PCharge)+(K8\times PIF1)+(K9\times PIT1)+(K10\times PIF2)+(K11\times PIT2)+(K12\times MainSOI)+(K13\times POF1)+(K14\times POT1)+(K15\times POF2)+(K16\times POT2)+(K17\times MainFuel)+(K18\times PRail\times PCharge)+(K19\times AFR\times PCharge)+(K20\times PRail\times MainFuel))\hat{}K21$; wherein, K0, K1, K2, K3, K4, K5, K6, K7, K8, K9, K10, K11, K12, K13, K14, K15, K16, K17, K18, K19, K20, and K21 are coefficients which are statistically determined from a dataset of empirical values, PCP is a peak cylinder pressure, InO2 is an amount of Oxygen (O2) in an intake charge, AFR is the intake charge air-fuel ratio, PRail is a injector rail pressure, SOI is a start of injection timing, PCharge is an intake charge pressure, Fuel is a total amount of fuel in all injections, TCharge is an intake charge temperature, PIF1 is an amount of fuel in a first pilot injection, PIT1 is a timing of the first pilot injection, PIF2 is an amount of fuel in a second pilot injection, PIT2 is an timing of the second pilot injection, MainSOI is a timing of a main injection, POF1 is an amount of fuel in a first post injection, POT1 is a timing of the first post injection, POF1 is an amount of fuel in a second post injection, POT1 is a timing of the first post injection, and MainFuel is an amount of fuel in the main injection event.

A twenty-first example embodiment is an apparatus for operating an engine system including a valvetrain comprising one or more intake valves and one or more exhaust valves, a variable valve actuation (VVA) system electronically controllable to vary operation of the valvetrain to selectably operate the engine in either a Miller cycle or a non-Miller cycle, and an electronic control system configured to control the VVA system, the apparatus comprising: a non-transitory memory medium configured to store instructions executable by the electronic control system to perform the acts of: evaluating using the electronic control system whether an engine speed condition is satisfied, a peak cylinder pressure (PCP) condition is satisfied, at least one of an air-fuel ratio (AFR) condition and an oxygen-fuel-control (OFC) condition is satisfied, and a minimum off time condition for the VVA system is satisfied; and operating the electronic control system to change operation of the engine from the Miller-cycle to the non-Miller cycle in response to the evaluating indicating that the engine speed condition is satisfied, the peak cylinder pressure (PCP) condition is satisfied, at least one of the air-fuel ratio (AFR) condition and the oxygen-fuel-control (OFC) condition is satisfied, and the minimum off time condition for the VVA system is satisfied.

A twenty-second example embodiment includes the features of the twenty-first example embodiment, wherein the act of evaluating indicates that the engine speed condition is satisfied if an engine speed does not exceed an engine speed threshold.

A twenty-third example embodiment includes the features of the twenty-first example embodiment, wherein the act of evaluating indicates that the PCP condition is satisfied if an estimated peak cylinder pressure of the engine does not exceed a PCP threshold.

A twenty-fourth example embodiment includes the features of the twenty-first example embodiment, wherein the act of evaluating indicates that one of the AFR condition is satisfied if an air-fuel-ratio of the engine does not exceed an AFR threshold, and the evaluating indicates that the OFC condition is satisfied if the engine is operating in an oxygen fuel control mode.

A twenty-fifth example embodiment includes the features of the twenty-first example embodiment, wherein the act of evaluating indicates that the minimum off time condition for the VVA system is satisfied if the VVA system has been off or deactivated for at least a predetermined time.

A twenty-sixth example embodiment includes the features of the twenty-first example embodiment, wherein the instructions are executable by the electronic control system to perform the acts of: additionally evaluating whether the engine speed condition is not satisfied, the PCP condition is not satisfied, the AFR condition is not satisfied, and a maximum on time condition for the VVA system is satisfied; and additionally operating the electronic control system to change operation of the engine from the non-Miller cycle to the Miller-cycle in response to the additionally evaluating indicating that any of: the engine speed condition is not satisfied, the PCP condition is not satisfied, the AFR condition is not satisfied, and a maximum on time condition for the VVA system is satisfied.

A twenty-seventh example embodiment includes the features of the twenty-sixth example embodiment, wherein the act of additionally evaluating indicates that the maximum on time condition for the VVA system is satisfied if the VVA system has been on or activated for at least a predetermined time.

A twenty-eighth example embodiment includes the features of the twenty-first example embodiment, wherein the instructions are executable by the electronic control system to perform the act of: determining the PCP condition by comparing a peak cylinder pressure value provided by a virtual sensor to a PCP threshold.

A twenty-ninth example embodiment includes the features of the twenty-eighth example embodiment, wherein the instructions are executable by the electronic control system to perform the act of: operating the virtual sensor to determine the peak cylinder pressure value in response to a combination of input parameters comprising one or more of: an intake charge amount of Oxygen, an intake charge air-fuel ratio, an injector rail pressure, a start of injection timing, an intake charge pressure, a total amount of fuel in all injections, an intake charge temperature, an amount of fuel in a first pilot injection, a timing of the first pilot injection, an amount of fuel in a second pilot injection, a timing of the second pilot injection, a timing of a main injection, an amount of fuel in a first post injection, a timing of the first post injection, an amount of fuel in a second post injection, a timing of the first post injection, and an amount of fuel in a main injection event.

A thirtieth example embodiment includes the features of the twenty-ninth example embodiment, wherein the instructions are executable by the electronic control system to perform the act of operating the virtual sensor to determine the peak cylinder pressure value in accordance with the equation: PCP=(K0+(K1×InO2)+(K2×AFR)+(K3×PRail)+(K4×SOI×PCharge)+(K5×AFR×Fuel)+(K6×TCharge)+(K7×PCharge)+(K8×PIF1)+(K9×PIT1)+(K10×PIF2)+(K11×PIT2)+(K12×MainSOI)+(K13×POF1)+(K14×POT1)+(K15×POF2)+(K16×POT2)+(K17×MainFuel)+(K18×PRail×PCharge)+(K19×AFR×PCharge)+(K20×PRail×MainFuel))^K21; wherein, K0, K1, K2, K3, K4, K5, K6, K7, K8, K9, K10, K11, K12, K13, K14, K15, K16, K17, K18, K19, K20, and K21 are coefficients which are statistically determined from a dataset of empirical values, PCP is a peak cylinder pressure, InO2 is an amount of Oxygen (O2) in an intake charge, AFR is an intake charge air-fuel ratio, PRail is a injector rail pressure, SOI is a start of injection timing, PCharge is an intake charge pressure, Fuel is a total amount of fuel in all injections, TCharge is an intake charge temperature, PIF1 is an amount of fuel in a first pilot injection, PIT1 is a timing of the first pilot injection, PIF2 is an amount of fuel in a second pilot injection, PIT2 is an timing of the second pilot injection, MainSOI is a timing of a main injection, POF1 is an amount of fuel in a first post injection, POT1 is a timing of the first post injection, POF1 is an amount of fuel in a second post injection, POT1 is a timing of the first post injection, and MainFuel is an amount of fuel in the main injection event.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as “a,” “an,” “at least one,” or “at least one portion” are used there is no intention to limit the claim to only one item unless specifically stated to the contrary in the claim. When the language “at least a portion” and/or “a portion” is used the item can include a portion and/or the entire item unless specifically stated to the contrary.

The invention claimed is:

1. A system comprising:

an engine including a valvetrain comprising one or more intake valves and one or more exhaust valves;

a variable valve actuation (VVA) system electronically controllable to vary operation of the valvetrain to selectably operate the engine in either a Miller cycle or a non-Miller cycle; and an electronic control system configured to evaluate an engine speed condition, evaluate a peak cylinder pressure (PCP) condition, evaluate an air-fuel ratio (AFR) condition, evaluate an oxygen-fuel-control (OFC) condition, and evaluate a minimum off time condition for the VVA system, and to control the VVA system to change operation of the engine from the Miller-cycle to the non-Miller cycle if:

the engine speed condition is satisfied, the peak cylinder pressure (PCP) condition is satisfied, at least one of the air-fuel ratio (AFR) condition and the oxygen-fuel-control (OFC) condition is satisfied, and the minimum off time condition for the VVA system is satisfied;

wherein the electronic control is configured to: operate a virtual sensor to provide a peak cylinder pressure value in response to a set virtual sensor parameters including: an intake charge air-fuel ratio, an intake charge pressure, an intake charge temperature, an injector rail pressure, and an amount and timing of one or more fuel injection events; and determining the PCP condition by comparing the peak cylinder pressure value provided by a virtual sensor to a PCP threshold.

2. The system of claim 1, wherein the engine speed condition is satisfied if an engine speed does not exceed an engine speed threshold.

3. The system of claim 1, wherein the PCP condition is satisfied if an estimated peak cylinder pressure of the engine does not exceed a PCP threshold.

4. The system of claim 1, wherein one of the AFR condition is satisfied if an air-fuel-ratio of the engine does not exceed an AFR threshold, and the OFC condition is satisfied if the engine is operating in an oxygen fuel control mode.

5. The system of claim 1, wherein the minimum off time condition for the VVA system is satisfied if the VVA system has been off or deactivated for at least a predetermined time.

6. The system of claim 1, wherein the electronic control system is configured to control the VVA system to change operation of the engine from the non-Miller cycle to the Miller-cycle if any of:

the engine speed condition is not satisfied, the PCP condition is not satisfied, the AFR condition is not satisfied, and a maximum on time condition for the VVA system is satisfied.

7. The system of claim 6, wherein the maximum on time condition for the VVA system is satisfied if the VVA system has been on or activated for at least a predetermined time.

8. The system of claim 1, event wherein the amount and timing of one or more fuel injection events comprises: a total amount of fuel in all injections, an amount of fuel in a first pilot injection, a timing of the first pilot injection, an amount of fuel in a second pilot injection, a timing of the second pilot injection, a timing of a main injection, an amount of fuel in a main injection event, an amount of fuel in a first post injection, a timing of the first post injection, an amount of fuel in a second post injection, and a timing of the first post injection.

9. The system of claim 8, wherein the virtual sensor is configured to determine the peak cylinder pressure value in accordance with the equation:

PCP=(K0+(K1×InO2)+(K2×AFR)+(K3×PRail)+(K4×SOI×PCharge)+(K5×AFR×Fuel)+(K6×TCharge)+(K7×PCharge)+(K8×PIF1)+(K9×PIT1)+(K10×PIF2)+(K11×PIT2)+(K12×MainSOI)+(K13×POF1)+(K14×POT1)+(K15×POF2)+(K16×POT2)+(K17×MainFuel)+(K18×PRail×PCharge)+(K19×AFR×PCharge)+(K20×PRail×MainFuel))/\K21;

wherein,

K0, K1, K2, K3, K4, K5, K6, K7, K8, K9, K10, K11, K12, K13, K14, K15, K16, K17, K18, K19, K20, and K21 are coefficients which are statistically determined from a dataset of empirical values,
PCP is a peak cylinder pressure,
InO2 is an amount of Oxygen (O2) in an intake charge,
AFR is the intake charge air-fuel ratio,
PRail is an injector rail pressure,
SOI is a start of injection timing,
PCharge is an intake charge pressure,
Fuel is a total amount of fuel in all injections,
TCharge is an intake charge temperature,
PIF1 is an amount of fuel in a first pilot injection,
PIT1 is a timing of the first pilot injection,
PIF2 is an amount of fuel in a second pilot injection,
PIT2 is a timing of the second pilot injection,
MainSOI is a timing of a main injection,
POF1 is an amount of fuel in a first post injection,
POT1 is a timing of the first post injection,
POF1 is an amount of fuel in a second post injection,
POT1 is a timing of the first post injection, and
MainFuel is an amount of fuel in the main injection event.

10. A method of operating an engine system including a valvetrain comprising one or more intake valves and one or more exhaust valves, a variable valve actuation (VVA) system electronically controllable to vary operation of the valvetrain to selectably operate the engine in either a Miller cycle or a non-Miller cycle, and an electronic control system configured to control the VVA system, the method comprising:

evaluating using the electronic control system whether an engine speed condition is satisfied, a peak cylinder pressure (PCP) condition is satisfied, whether an air-fuel ratio (AFR) condition is satisfied, and whether an oxygen-fuel-control (OFC) condition is satisfied, and a minimum off time condition for the VVA system is satisfied; and operating the electronic control system to change operation of the engine from the Miller-cycle to the non-Miller cycle in response to the evaluating indicating that the engine speed condition is satisfied, the peak cylinder pressure (PCP) condition is satisfied, at least one of the air-fuel ratio (AFR) condition and the oxygen-fuel-control (OFC) condition is satisfied, and the minimum off time condition for the VVA system is satisfied;

wherein the evaluating using the electronic control system includes operating a virtual sensor to provide a peak cylinder pressure value in response to a set virtual sensor parameters including: an intake charge air-fuel ratio, an intake charge pressure, an intake charge temperature, an injector rail pressure, and an amount and timing of one or more fuel injection events; and determining the PCP condition by comparing the peak cylinder pressure value provided by a virtual sensor to a PCP threshold.

11. The method of claim 10, wherein the evaluating indicates that the engine speed condition is satisfied if an engine speed does not exceed an engine speed threshold.

12. The method of claim 10, wherein the evaluating indicates that the PCP condition is satisfied if an estimated peak cylinder pressure of the engine does not exceed a PCP threshold.

13. The method of claim 10, wherein the evaluating indicates that one of the AFR condition is satisfied if an air-fuel-ratio of the engine does not exceed an AFR threshold, and the evaluating indicates that the OFC condition is satisfied if the engine is operating in an oxygen fuel control mode.

14. The method of claim 10, wherein the evaluating indicates that the minimum off time condition for the VVA system is satisfied if the VVA system has been off or deactivated for at least a predetermined time.

15. The method of claim 10, comprising:

additionally evaluating whether the engine speed condition is not satisfied, the PCP condition is not satisfied, the AFR condition is not satisfied, and a maximum on time condition for the VVA system is satisfied; and additionally operating the electronic control system to change operation of the engine from the non-Miller cycle to the Miller-cycle in response to the additionally evaluating indicating that any of: the engine speed condition is not satisfied, the PCP condition is not satisfied, the AFR condition is not satisfied, and a maximum on time condition for the VVA system is satisfied.

16. The method of claim 15, wherein the additionally evaluating indicates that the maximum on time condition for the VVA system is satisfied if the VVA system has been on or activated for at least a predetermined time.

17. The method of claim 10, wherein the amount and timing of one or more fuel injection events comprises: a total amount of fuel in all injections, an amount of fuel in a first pilot injection, a timing of the first pilot injection, an amount of fuel in a second pilot injection, a timing of the second pilot injection, a timing of a main injection, an amount of fuel in a main injection event, an amount of fuel in a first post injection, a timing of the first post injection, an amount of fuel in a second post injection, and a timing of the first post injection.

18. The method of claim 17, comprising operating the virtual sensor to determine the peak cylinder pressure value in accordance with the equation:

PCP=(K0+(K1×InO2)+(K2×AFR)+(K3×PRail)+(K4×SOI×PCharge)+(K5×AFR×Fuel)+(K6×TCharge)+(K7×PCharge)+(K8×PIF1)+(K9×PIT1)+(K10×PIF2)+(K11×PIT2)+(K12×MainSOI)+(K13×POF1)+(K14×POT1)+(K15×POF2)+(K16×POT2)+(K17×MainFuel)+(K18×PRail×PCharge)+(K19×AFR×PCharge)+(K20×PRail×MainFuel))/\K21;

wherein,
K0, K1, K2, K3, K4, K5, K6, K7, K8, K9, K10, K11, K12, K13, K14, K15, K16, K17, K18, K19, K20, and K21 are coefficients which are statistically determined from a dataset of empirical values,
PCP is a peak cylinder pressure,
InO2 is an amount of Oxygen (O2) in an intake charge,
AFR is the intake charge air-fuel ratio,
PRail is an injector rail pressure,
SOI is a start of injection timing,
PCharge is an intake charge pressure,
Fuel is a total amount of fuel in all injections,
TCharge is an intake charge temperature,
PIF1 is an amount of fuel in a first pilot injection,
PIT1 is a timing of the first pilot injection,
PIF2 is an amount of fuel in a second pilot injection,
PIT2 is a timing of the second pilot injection,
MainSOI is a timing of a main injection,
POF1 is an amount of fuel in a first post injection,
POT1 is a timing of the first post injection,
POF1 is an amount of fuel in a second post injection,
POT1 is a timing of the first post injection, and
MainFuel is an amount of fuel in the main injection event.

19. An apparatus for operating an engine system including a valvetrain comprising one or more intake valves and one or more exhaust valves, a variable valve actuation (VVA) system electronically controllable to vary operation of the valvetrain to selectably operate the engine in either a Miller cycle or a non-Miller cycle, and an electronic control system configured to control the VVA system, the apparatus comprising:

a non-transitory memory medium configured to store instructions executable by the electronic control system to perform the acts of:

evaluating using the electronic control system whether an engine speed condition is satisfied, a peak cylinder pressure (PCP) condition is satisfied, at least one of an air-fuel ratio (AFR) condition and an oxygen-fuel-control (OFC) condition is satisfied, and a minimum off time condition for the VVA system is satisfied; and operating the electronic control system to change operation of the engine from the Miller-cycle to the non-Miller cycle in response to the evaluating indicating that the engine speed condition is satisfied, the peak cylinder pressure (PCP) condition is satisfied, at least one of the air-fuel ratio (AFR) condition and the oxygen-fuel-control (OFC) condition is satisfied, and the minimum off time condition for the VVA system is satisfied;

wherein the instructions are executable by the electronic control system to perform the acts of: operating a virtual sensor to provide a peak cylinder pressure value in response to a set virtual sensor parameters including: an intake charge air-fuel ratio, an intake charge pressure, an intake charge temperature, an injector rail pressure, and an amount and timing of one or more fuel injection events; and determining the PCP condition by comparing the peak cylinder pressure value provided by a virtual sensor to a PCP threshold.

20. The apparatus of claim 19, wherein the act of evaluating indicates that the engine speed condition is satisfied if an engine speed does not exceed an engine speed threshold.

21. The apparatus of claim 19, wherein the act of evaluating indicates that the PCP condition is satisfied if an estimated peak cylinder pressure of the engine does not exceed a PCP threshold.

22. The apparatus of claim 19, wherein the act of evaluating indicates that one of the AFR condition is satisfied if an air-fuel-ratio of the engine does not exceed an AFR threshold, and the evaluating indicates that the OFC condition is satisfied if the engine is operating in an oxygen fuel control mode.

23. The apparatus of claim 19, wherein the act of evaluating indicates that the minimum off time condition for the VVA system is satisfied if the VVA system has been off or deactivated for at least a predetermined time.

24. The apparatus of claim 19, wherein the instructions are executable by the electronic control system to perform the acts of:

additionally evaluating whether the engine speed condition is not satisfied, the PCP condition is not satisfied, the AFR condition is not satisfied, and a maximum on time condition for the VVA system is satisfied; and additionally operating the electronic control system to change operation of the engine from the non-Miller cycle to the Miller-cycle in response to the additionally evaluating indicating that any of: the engine speed condition is not satisfied, the PCP condition is not satisfied, the AFR condition is not satisfied, and a maximum on time condition for the VVA system is satisfied.

25. The apparatus of claim 24, wherein the act of additionally evaluating indicates that the maximum on time condition for the VVA system is satisfied if the VVA system has been on or activated for at least a predetermined time.

26. The apparatus of claim 19, wherein the amount and timing of one or more fuel injection events comprises: a total amount of fuel in all injections, an amount of fuel in a first pilot injection, a timing of the first pilot injection, an amount of fuel in a second pilot injection, a timing of the second pilot injection, a timing of a main injection, an amount of fuel in a main injection event, an amount of fuel in a first post injection, a timing of the first post injection, an amount of fuel in a second post injection, and a timing of the first post injection.

27. The apparatus of claim 26, wherein the instructions are executable by the electronic control system to perform the act of operating the virtual sensor to determine the peak cylinder pressure value in accordance with the equation:

$$PCP=(K0+(K1\times InO2)+(K2\times AFR)+(K3\times PRail)+(K4\times SOI\times PCharge)+(K5\times AFR\times Fuel)+(K6\times TCharge)+(K7\times PCharge)+(K8\times PIF1)+(K9\times PIT1)+(K10\times PIF2)+(K11\times PIT2)+(K12\times MainSOI)+(K13\times POF1)+(K14\times POT1)+(K15\times POF2)+(K16\times POT2)+(K17\times MainFuel)+(K18\times PRail\times PCharge)+(K19\times AFR\times PCharge)+(K20\times PRail\times MainFuel))\wedge K21;$$

wherein,

K0, K1, K2, K3, K4, K5, K6, K7, K8, K9, K10, K11, K12, K13, K14, K15, K16, K17, K18, K19, K20, and K21 are coefficients which are statistically determined from a dataset of empirical values, PCP is a peak cylinder pressure, InO2 is an amount of Oxygen (O2) in an intake charge, AFR is an intake charge air-fuel ratio, PRail is an injector rail pressure, SOI is a start of injection timing, PCharge is an intake charge pressure, Fuel is a total amount of fuel in all injections, TCharge is an intake charge temperature, PIF1 is an amount of fuel in a first pilot injection, PIT1 is a timing of the first pilot injection, PIF2 is an amount of fuel in a second pilot injection, PIT2 is a timing of the second pilot injection, MainSOI is a timing of a main injection, POF1 is an amount of fuel in a first post injection, POT1 is a timing of the first post injection, POF1 is an amount of fuel in a second post injection, POT1 is a timing of the first post injection, and MainFuel is an amount of fuel in the main injection event.

* * * * *